United States Patent
Edwards et al.

(10) Patent No.: US 10,653,236 B2
(45) Date of Patent: May 19, 2020

(54) METHODS AND SYSTEMS FOR CALIBRATING AN ORAL CLEANING DEVICE

(71) Applicant: KONINKLIJKE PHILIPS N.V., Eindhoven (NL)

(72) Inventors: Martin John Edwards, Solihull (GB); Toon Hardeman, s'Hertogenbosch (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 45 days.

(21) Appl. No.: 16/089,093

(22) PCT Filed: Mar. 27, 2017

(86) PCT No.: PCT/IB2017/051728
§ 371 (c)(1),
(2) Date: Sep. 27, 2018

(87) PCT Pub. No.: WO2017/168301
PCT Pub. Date: Oct. 5, 2017

(65) Prior Publication Data
US 2019/0104837 A1 Apr. 11, 2019

Related U.S. Application Data

(60) Provisional application No. 62/315,181, filed on Mar. 30, 2016.

(51) Int. Cl.
*A46B 15/00* (2006.01)
*A61C 17/22* (2006.01)

(52) U.S. Cl.
CPC ...... *A46B 15/0012* (2013.01); *A46B 15/0002* (2013.01); *A46B 15/0006* (2013.01); *A61C 17/221* (2013.01); *A46B 2200/1066* (2013.01)

(58) Field of Classification Search
CPC ............ A46B 15/0012; A46B 15/0002; A46B 15/0006; A46B 2200/1066; A61C 17/221
See application file for complete search history.

(56) References Cited

U.S. PATENT DOCUMENTS

| | | | |
|---|---|---|---|
| 5,493,747 A | 2/1996 | Inakagata et al. | |
| 6,035,694 A | 3/2000 | Dupuie et al. | |
| 6,389,636 B1 * | 5/2002 | Savill ................. | A46B 15/0002 116/212 |

(Continued)

FOREIGN PATENT DOCUMENTS

WO 2014037856 A1 3/2014

*Primary Examiner* — Weilun Lo (57) ABSTRACT

A method (500) for calibrating a pressure sensor (28) of an oral cleaning device (10). The method comprises the steps of: providing an oral cleaning device comprising a body portion (12), an elongated member (14, 720) extending from the body portion and comprising a head (16, 770), a pressure sensor (28) configured to obtain a measurement of a force applied to the head by the user during a cleaning session, and a processor (32) configured to receive, from the pressure sensor, the measurement of force applied to the head; obtaining a non-zero load calibration parameter; and calibrating, by the processor using the non-zero load calibration parameter, the measurement of force received from the pressure sensor.

12 Claims, 8 Drawing Sheets

(56) References Cited

U.S. PATENT DOCUMENTS

| | | | |
|---|---|---|---|
| 6,536,068 B1 * | 3/2003 | Yang | A46B 15/0002 15/105 |
| 8,544,131 B2 * | 10/2013 | Braun | A46B 15/0002 15/105 |
| 8,981,914 B1 | 3/2015 | Stetten | |
| 2011/0294096 A1 | 12/2011 | deCastro et al. | |
| 2011/0314677 A1 * | 12/2011 | Meier | B26B 21/4056 30/41.8 |
| 2012/0110763 A1 | 5/2012 | Jungnickel et al. | |
| 2012/0151698 A1 * | 6/2012 | Schaefer | A61C 17/222 15/28 |
| 2015/0065851 A1 | 3/2015 | Ludwin et al. | |
| 2016/0331119 A1 * | 11/2016 | Schaefer | A46B 15/0012 |
| 2016/0331120 A1 * | 11/2016 | Scheele | A46B 15/0012 |
| 2018/0279763 A1 * | 10/2018 | Tamminga | A46B 15/0006 |

* cited by examiner

METHODS AND SYSTEMS FOR CALIBRATING AN ORAL CLEANING DEVICE

CROSS-REFERENCE TO PRIOR APPLICATIONS

This application is the U.S. National Phase application under 35 U.S.C. § 371 of International Application No. PCT/IB2017/051728, filed on Mar. 27, 2017, which claims the benefit of U.S. Provisional Patent Application No. 62/315,181, filed on Mar. 30, 2016. These applications are hereby incorporated by reference herein.

FIELD OF THE INVENTION

The present disclosure is directed generally to methods and systems for calibrating a pressure sensor of an oral cleaning device.

BACKGROUND

Proper tooth brushing technique, including length and coverage of brushing, helps ensure long-term dental health. Many dental problems are experienced by individuals who either do not regularly brush their teeth or who do so inadequately. Among individuals who do regularly brush, improper brushing habits can result in poor coverage of brushing and thus surfaces that are not adequately cleaned.

To facilitate proper brushing technique, it is important to ensure that there is adequate cleaning of all dental surfaces, including areas of the mouth that are hard to reach or that tend to be improperly cleaned during an average brushing session. Further, it is important to ensure that the proper amount of force or pressure is applied to the teeth while cleaning. The use of excessive pressure during tooth brushing can damage the oral tissues and wear down tooth enamel. The use of excessive pressure can also lead to reduced bristle motion which can result in poorer plaque removal. One way to ensure adequate coverage and pressure is to provide feedback to users when brushing force exceeds a pre-defined threshold level. This feedback, such as haptic feedback, acts as an indicator to users to reduce their brushing pressure.

Force sensors in existing oral cleaning devices have approximately linear characteristics and are calibrated during production. The calibration parameters can be, for example, stored in the device allowing the output signal of the sensor to be related to the force applied to the brush head. Over time, however, the characteristics of the pressure sensor may change. To adjust to these changing characteristics, existing oral cleaning devices may perform a one-point zero load calibration. For example, when the oral cleaning device is placed on a charging base, it can be assumed that there is zero load on the brush head and the corresponding sensor output can be taken as the offset value. However, the zero load calibration approach results in a relatively low level of accuracy and is therefore not well-equipped to efficiently adapt to changing characteristics of the pressure sensor.

Accordingly, there is a continued need in the art for methods and systems for accurate calibration of a pressure sensor of an oral cleaning device.

SUMMARY OF THE INVENTION

The present disclosure is directed to inventive methods and systems for calibrating a pressure sensor of an oral cleaning device. Applied to an oral cleaning system configured to calibrate the associated oral cleaning device, the inventive methods and systems enable improved calibration of the pressure sensor and thus allow for improved pressure feedback to the user. This results in an improved cleaning session by the user. Using a non-zero force value applied to the pressure sensor during periods when the oral cleaning device is not being utilized by the user, the pressure sensor is calibrated. The non-zero force can be applied by, for example, a resistive force mechanism or using at least a portion of the mass of the oral cleaning device itself.

Generally in one aspect, an oral cleaning device is provided. The oral cleaning device includes: a body portion, an elongated member extending from the body portion and comprising a head, a pressure sensor configured to obtain a measurement of a force applied to the head by the user during a cleaning session; and a processor configured to receive, from the pressure sensor, the measurement of force applied to the head, and further configured to: (i) obtain a non-zero load calibration parameter; and (ii) calibrate, using the obtained non-zero load calibration parameter, the measurement of force received from the pressure sensor.

According to an embodiment, the processor is further configured to obtain a zero load calibration parameter, and the calibration is performed using both the obtained non-zero load calibration parameter and the obtained zero load calibration parameter.

According to an embodiment, the non-zero load calibration parameter is obtained while the oral cleaning device is not in use.

According to an embodiment, at least a portion of the mass of the oral cleaning device is the non-zero load. According to an embodiment, the oral cleaning device is oriented substantially horizontally to obtain the non-zero load calibration parameter.

According to an embodiment, the non-zero load calibration parameter is obtained while the oral cleaning device is compressing a resistive force. According to an embodiment, the resistive force is applied by a spring.

According to an aspect is an oral cleaning system. The oral cleaning system includes: (i) an oral cleaning device comprising a body portion, an elongated member extending from the body portion and comprising a head, a pressure sensor configured to obtain a measurement of a force applied to the head by the user during a cleaning session, and a processor configured to receive, from the pressure sensor, the measurement of force applied to the head, and further configured to obtain a non-zero load calibration parameter, and calibrate, using the non-zero load calibration parameter, the measurement of force received from the pressure sensor; and (ii) a charging station configured to receive the oral cleaning device while the non-zero load calibration parameter is obtained.

According to an embodiment, the charging station comprises a support configured to receive at least a portion of the oral cleaning device such that a non-zero load is applied to the oral cleaning device and is detected by the pressure sensor. According to an embodiment, the support is configured such that at least a portion of the mass of the oral cleaning device is the non-zero load.

According to an embodiment, the charging station comprises a resistive force mechanism configured to apply a resistive force to at least a portion of the oral cleaning device such that a non-zero load is applied to the oral cleaning device and is detected by the pressure sensor.

According to an aspect is a method for calibrating a pressure sensor of an oral cleaning device. The method includes the steps of: (i) providing an oral cleaning device comprising a body portion, an elongated member extending from the body portion and comprising a head, a pressure sensor configured to obtain a measurement of a force applied to the head by the user during a cleaning session, and a processor configured to receive, from the pressure sensor, the measurement of force applied to the head; (ii) obtaining a non-zero load calibration parameter; and (iii) calibrating, by the processor using the non-zero load calibration parameter, the measurement of force received from the pressure sensor.

According to an embodiment, the method further includes the steps of obtaining a zero load calibration parameter, and wherein said calibrating step comprises calibrating, by the processor using both the non-zero load calibration parameter and the zero load calibration parameter, the measurement of force received from the pressure sensor.

According to an embodiment, the method further includes the step of positioning the oral cleaning device such that at least a portion of the mass of the oral cleaning device comprises the non-zero load.

According to an embodiment, the method further includes the step of applying a resistive force to the oral cleaning device such that the resistive force comprises the non-zero load.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method and system for calibrating a pressure sensor of an oral cleaning device. More generally, Applicant has recognized and appreciated that it would be beneficial to provide a system that calibrates a pressure sensor using a non-zero load calibration mechanism. Accordingly, the methods and systems described or otherwise envisioned herein provide an oral cleaning device configured to calibrate the device's pressure sensor using at least one non-zero force value applied to the pressure sensor, including but not limited to calibration performed during periods when the oral cleaning device is not being utilized by the user. According to an embodiment, the non-zero force can be applied by, for example, a spring mechanism or using at least a portion of the mass of the oral cleaning device itself. The non-zero calibration can be utilized alone or can be combined with a zero load calibration method to add an additional level of calibration.

A particular goal of utilization of the embodiments and implementations herein is to provide brushing information using an oral cleaning device such as, e.g., a Philips Sonicare™ toothbrush (manufactured by Koninklijke Philips Electronics, N.V.), although the embodiments described or otherwise envisioned herein may be utilized with any appropriate device.

Figure 1:
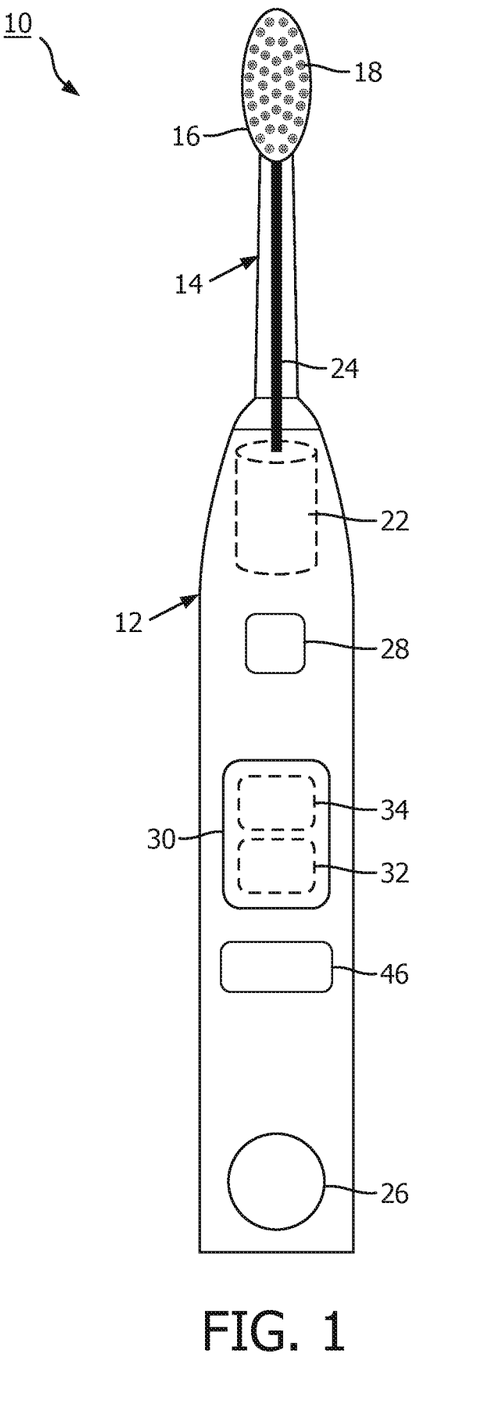
FIG. 1 is a representation of an oral cleaning device in accordance with an embodiment.

Referring to FIG. 1, in one embodiment, an oral cleaning device 10 is provided that includes a body portion 12 and a brush head member 14 mounted on the body portion. Brush head member 14 includes at its end remote from the body portion a brush head 16. Brush head 16 includes a bristle face 18, which provides a plurality of bristles. According to an embodiment, the bristles extend along an axis substantially perpendicular to the head's axis of elongation, although many other embodiments of the brush head and bristles are possible.

According to one possible embodiment, head member 14, brush head 16, and/or bristle face 18 are mounted so as to be able to move relative to the body portion 12. The movement can be any of a variety of different movements, including vibrations or rotation, among others. According to an embodiment, head member 14 is mounted to the body so as to be able to vibrate relative to body portion 12, or, as another example, brush head 16 is mounted to head member 14 so as to be able to vibrate relative to body portion 12. For example, in accordance with an embodiment, the bristles are vibrated at a frequency that is equal to or greater than approximately 250 Hz, but many other frequencies, patterns, and vibrations are possible. The head member 14 can be fixedly mounted onto body portion 12, or it may alternatively be detachably mounted so that head member 14 can be replaced with a new one when the bristles or another component of the device are worn out and require replacement.

According to an embodiment, body portion 12 includes a drivetrain 22 for generating movement and a transmission component 24 for transmitting the generated movements to brush head member 14. For example, drivetrain 22 can comprise a motor or electromagnet(s) that generates movement of the transmission component 24, which is subsequently transmitted to the brush head member 14. Drivetrain 22 can include components such as a power supply, an oscillator, and one or more electromagnets, among other components. In this embodiment the power supply comprises one or more rechargeable batteries, not shown, which can, for example, be electrically charged in a charging holder in which oral cleaning device 10 is placed when not in use.

Although in the present embodiment the oral cleaning device 10 is an electric toothbrush, it will be understood that in an alternative embodiment the oral cleaning device is a manual toothbrush (not shown). In such an arrangement, the manual toothbrush has electrical components, but the brush head is not mechanically actuated by an electrical component.

Body portion 12 is further provided with a user input 26 to activate and de-activate movement generator 22. The user input 26 allows a user to operate the toothbrush 20, for example to turn the toothbrush 20 on and off. The user input 26 may, for example, be a button, touch screen, or switch.

The oral cleaning device 10 includes one or more sensors 28. Sensor 28 is shown in FIG. 1 within body portion 12, but may be located anywhere within the device, including for example within brush head member 14 or brush head 16. The sensors 28 can comprise, for example, a pressure sensor configured to determine when an external pressure greater than a predetermined pressure is exerted against the brush head member 14 and/or brush head 16. The sensor 28 is configured to generate information indicative of the pressure exerted against the brush head member 14 and/or brush head 16. The pressure sensor can be, for example, a switch, a gauge, or another component. As one example, the pressure sensor is a Hall-effect sensor which responds to a changing magnetic field as the brush head member 14 and/or brush head 16 moves in response to pressure. The Hall-effect sensor determines lateral displacement of the brush head member 14 and/or brush head 16 due to force on the bristles against the teeth. Many different types of pressure sensors could be utilized, as described or otherwise envisioned herein.

According to an embodiment, the pressure sensor can activate a notification system such as a vibration mechanism, light, or other indicator once an external pressure greater than a predetermined pressure is exerted against the brush head member 14 and/or brush head 16. This provides brushing feedback to the user, who can then adjust the pressure. Once the pressure falls below the predetermined pressure, the pressure sensor can deactivate a notification system such as a vibration mechanism, light, or other indicator.

The information generated by the first sensor 28 is provided to a device controller 30. Controller 30 can comprise a processor 32 and a memory 34. The processor 32 may take any suitable form. For instance, processor 32 may be or include a microcontroller, plural microcontrollers, circuitry, a single processor, or plural processors. Controller 30 may be formed of one or multiple modules, and is operable to operate the oral cleaning device 10 in response to an input, for example user input 26. For example, controller 30 can be configured to actuate a motor control unit. According to an embodiment, the sensor 28 is integral to the controller 30.

The memory 34 can take any suitable form, including a non-volatile memory and/or RAM. The non-volatile memory may include read only memory (ROM), a hard disk drive (HDD) or a solid state drive (SSD). The memory can store, among other things, an operating system. The RANI is used by the processor for the temporary storage of data. The operating system may contain code which, when executed by controller 30, controls operation of each of the hardware components of the oral cleaning device 10.

According to an embodiment, the oral cleaning system includes a pressure indicator 46 configured to provide information to the user during the brushing session. The pressure indicator 46 can take various forms, but will provide instructions to the user that can be felt, read, viewed, heard, or otherwise interpreted concerning the amount of pressure applied by the user during the brushing session. For example, pressure indicator 46 can be a component of oral cleaning device 10, or the pressure indicator can be a component of a separate device. According to an embodiment, pressure indicator 46 is a vibration mechanism that causes the handle 12, brush head member 14, and/or brush head 16 to resonate when a pressure level is exceeded. According to another embodiment, pressure indicator 46 provides audible instructions to a user, a visual or graphical display, or another indicator. Additionally, the pressure indicator may adjust operation of the drivetrain 22 to provide haptic feedback to the user.

Figure 2:
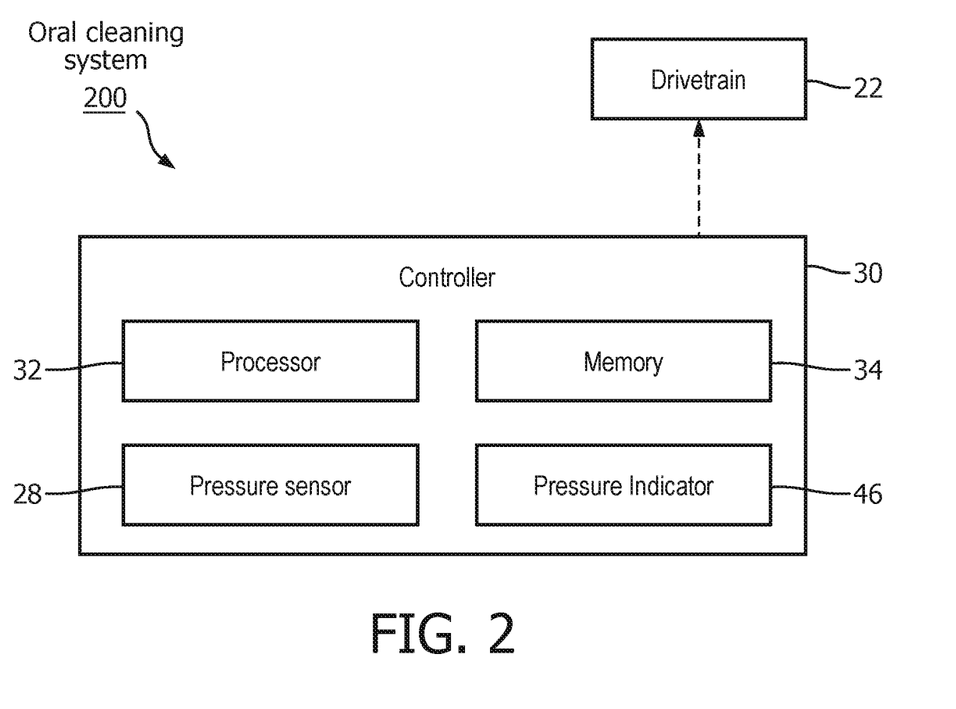
FIG. 2 is a schematic representation of an oral cleaning device in accordance with an embodiment.

Referring to FIG. 2, an embodiment of an oral cleaning system 200 is provided. According to an embodiment, oral cleaning system 200 includes one or more pressure sensors 28 and a controller 30 comprising a processor 32 and a memory 34. When utilized with electric cleaning devices, the oral cleaning system 200 includes a drivetrain 22, the operation of which is controlled by controller 30. The oral cleaning system also includes a pressure indicator 46. According to an embodiment, the controller 30 receives data from sensor 28 about pressure exerted by the user pushing the brush head member 14 and/or brush head 16 against surfaces within the mouth. The controller 30 and/or pressure indicator 46 provides feedback to the user during the brushing session when that pressure exceeds a predetermined level or amount.

Figure 3:
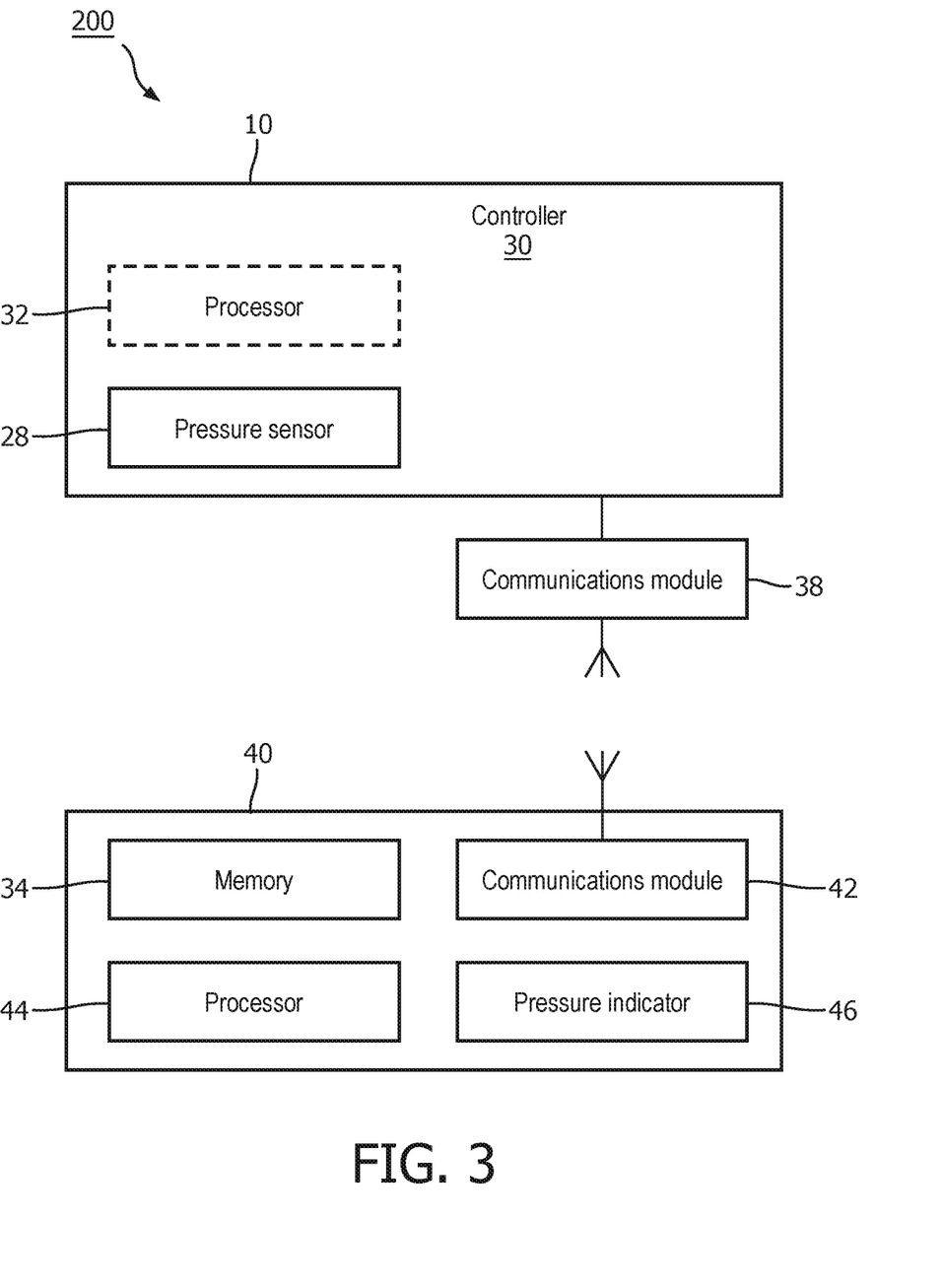
FIG. 3 is a schematic representation of an oral cleaning device system in accordance with an embodiment.

Referring to FIG. 3 is another embodiment of an oral cleaning system 200 comprising an oral cleaning device 10 and a device 40 which is separate from the oral cleaning device. The oral cleaning device 10 can be any of the oral cleaning device embodiments disclosed or otherwise envisioned herein. According to an embodiment, oral cleaning device 10 includes one or more pressure sensors 28, and a controller 30 comprising a processor 32. When utilized with electric cleaning devices, the oral cleaning device 10 includes a drivetrain 22, the operation of which is controlled by controller 30. According to an embodiment, oral cleaning device 10 comprises a communications module 38 that transmits collected pressure sensor information. The communications module can be any module, device, or means capable of transmitting a wired or wireless signal, including but not limited to a Wi-Fi, Bluetooth, near field communication, and/or cellular module.

According to an embodiment, device 40 can be any device configured to or capable of receiving and processing the pressure sensor information transmitted from oral cleaning device 10. For example, device 40 may be a cleaning device holder or station, a smartphone, a computer, a server, or any other computerized device. According to an embodiment, device 40 includes a communications module 42 which can be any module, device, or means capable of receiving a wired or wireless signal, including but not limited to a Wi-Fi, Bluetooth, near field communication, and/or cellular module. Device 40 also includes a processor 44 which uses the received pressure sensor information from sensor 28 to compare the pressure exerted by the user to a predetermined pressure threshold. According to an embodiment, device 40 may include memory 34 to store received pressure sensor information, or any other information. Further, device 40 may include a pressure indicator 46. According to an embodiment, the processor and/or pressure indicator 46 provides feedback to the user during the brushing session when the pressure exceeds the predetermined pressure threshold.

As just one example, oral cleaning device 10 can collect sensor information using pressure sensor 28 and transmit that information locally via a Bluetooth connection to a smartphone device 40, where the sensor information is processed and/or stored. As another example, oral cleaning device 10 can collect sensor information using sensor 28 and transmit that information via a WiFi connection to the Internet where it is communicated to a remote server device 40. The remote server device 40 processes and/or stores the sensor information. A user may access that information directly or may receive reports, updates, or other information from the remote server device 40 or an associated device.

Figure 4A:
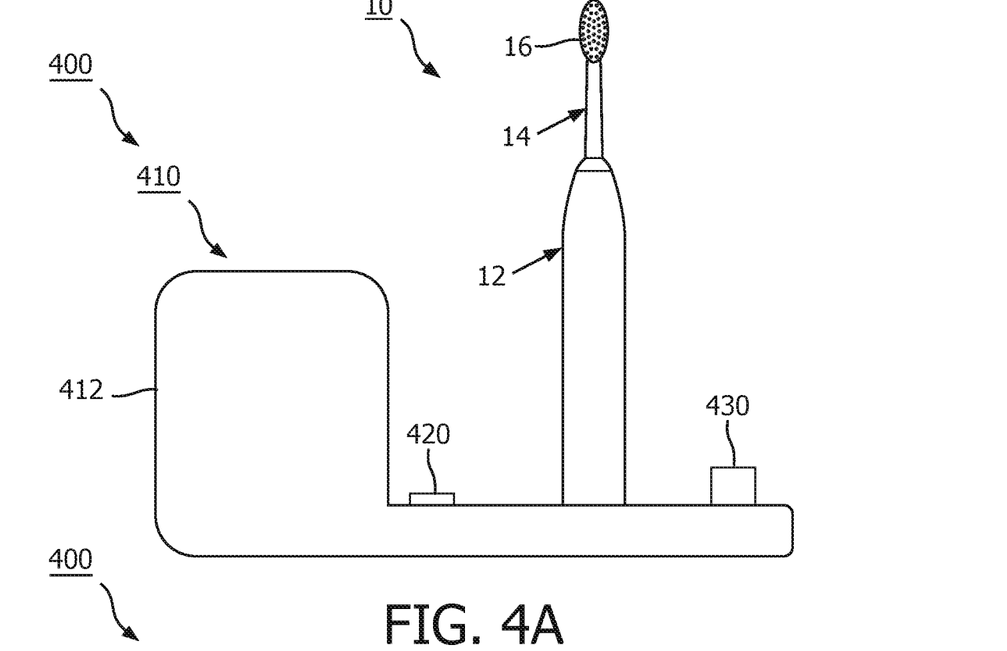
FIG. 4A is a schematic representation of an oral cleaning device system in accordance with an embodiment.

Referring to FIG. 4A is an embodiment of an oral cleaning system 400. According to an embodiment, oral cleaning system 400 includes an oral cleaning device 10 and a device 410 which is separate from the oral cleaning device. The oral cleaning device 10 can be any of the oral cleaning device embodiments disclosed or otherwise envisioned herein. According to an embodiment, oral cleaning device 10 includes one or more pressure sensors 28, and a controller 30 comprising a processor 32.

According to an embodiment, device 410 is a charging or docking station 410 for the oral cleaning device 10. Charging station 410 can include a mechanism for charging the handheld oral cleaning device when it is connected into the docking station. For example, the charging mechanism 414, shown in FIG. 6, can include one or more charging contacts corresponding to one or more charging contacts on the handheld device. The charging mechanism can alternatively charge the device via contactless inductive coupling between the charging station 410 and the handheld oral cleaning device 10. For example, in an inductive charging mechanism, the charging station includes an induction coil that generates an electromagnetic field that is received by the secondary coil of the handheld cleaning device and utilized to charge the battery of the device.

According to another embodiment, charging station 410 includes a reservoir 412 for holding water, mouthwash, antimicrobial fluids, and/or other liquids. According to an embodiment, when device 10 is connected into the charging station, fluid from the charging station reservoir can be used to fill the chamber on the device.

According to another embodiment, charging station 410 includes first support 420 and second support 430. As shown in FIG. 4C, either or both of first support 420 and second support 430 can be curved or otherwise shaped to receive at least a portion of oral cleaning device 10 when the device is placed on its side. As one example, the handle 12 of the oral cleaning device can be received by first support 420, and the brush head member 14 can be received by second support 430. As described herein, this positioning of the oral cleaning device facilitates non-zero load calibration.

Figure 7:
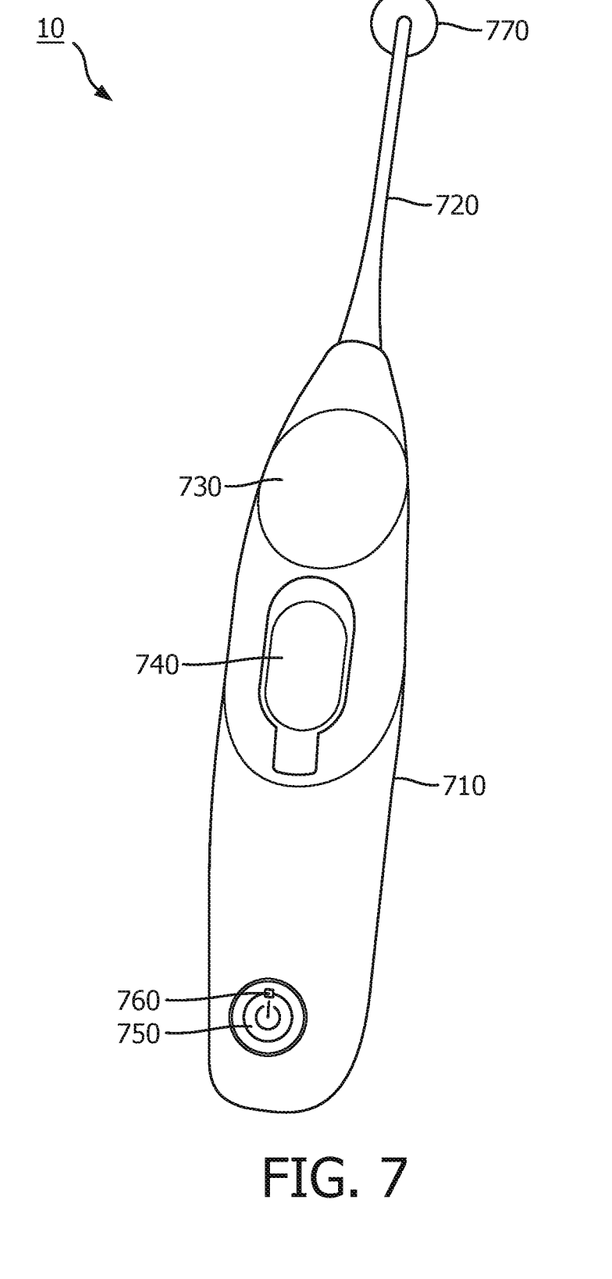
FIG. 7 is a schematic representation of an oral cleaning device in accordance with an embodiment.

According to an embodiment, the oral cleaning device 10 is any oral care appliance. For example, oral cleaning device is an oral care appliance for cleaning teeth using coordinated bursts of air and fluid. Examples of such an oral cleaning device 10 are Sonicare® electric toothbrushes and Airfloss® oral care appliances, available from Koninklijke Philips Electronics N.V. Referring to FIG. 7, in one embodiment, is an oral cleaning device 10 configured to produce a spray of liquid droplets which is used to clean the interproximal spaces between teeth. Handheld oral cleaning device 10 includes an outer housing which can be a plastic or other sufficiently hard or durable plastic. Handheld oral cleaning device 10 includes a handle 710, and an elongated nozzle 720 which extends outwardly from the device and can have a curved head portion 770 at the distal end thereof, through which a spray of liquid droplets is directed for cleaning action against surfaces of the mouth. Device 10 also includes an actuator 730, a chamber 740 for a liquid such as water, mouthwash, cleaning liquid, or other liquid, a power button 750 used to turn the device on or off, and a power/charge indicator 760, among many other components. In addition to a brushing device or a flossing device, oral cleaning device 10 may be any oral care or cleaning device. For example, oral care or cleaning device 10 may be any cleaning, polishing, brushing, scraping, or other device.

According to an embodiment, the oral cleaning device 10 comprises one or more sensors that facilitate detection of the position of the device. For example, device 10 may comprise a sensor such as an accelerometer sensor or switch to determine when the device is horizontal, vertical, or in another position. The device may utilize this positional information to determine that the device is positioned or situated properly for calibration. In addition to an accelerometer, multi-axis sensors may be utilized, among other sensors and mechanisms. According to an embodiment, the oral cleaning device 10 may comprise one or more algorithms that verify the zero and non zero load conditions based on inputs from a force sensor, the motor, or a sensor such as an inertial measurement unit (IMU), among other input information.

Figure 5:
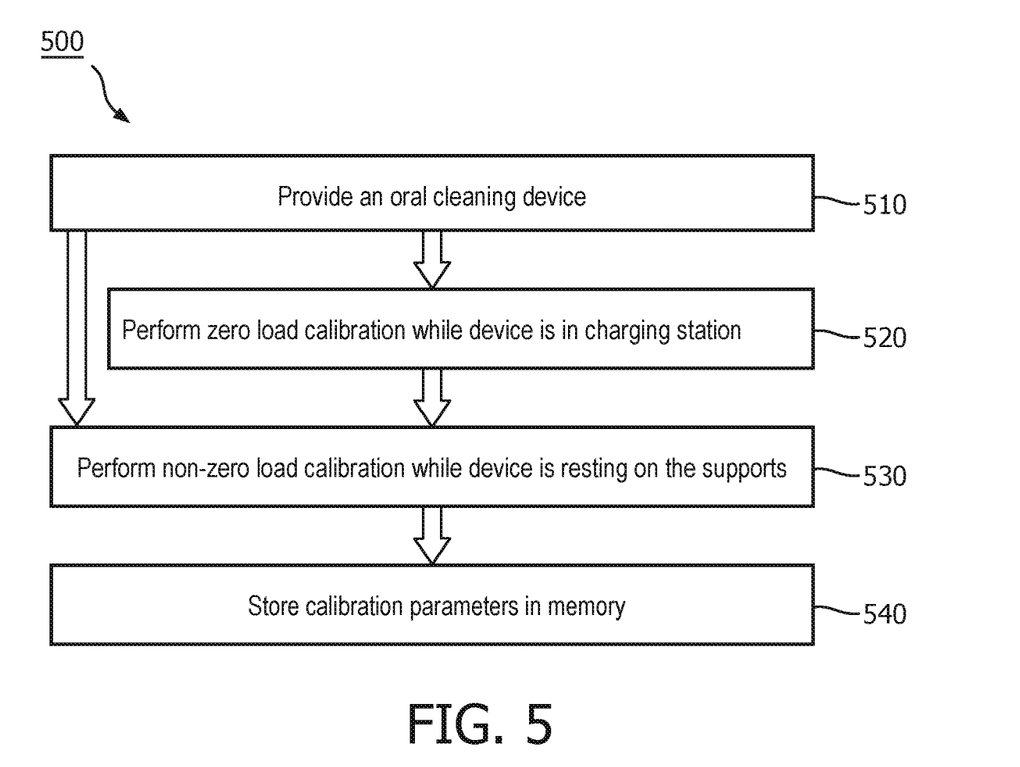
FIG. 5 is a flowchart depicting a method for calibrating an oral cleaning device in accordance with an embodiment.

Referring to FIG. 5, in one embodiment, is a flowchart of a method 500 for calibrating a pressure sensor of an oral cleaning device. At step 510 of the method, an oral cleaning device 10 is provided. The oral cleaning device can be any of the embodiments described or otherwise envisioned herein. For example, according to one embodiment, oral cleaning device 10 includes a body portion 12, a brush head member 14 with a bristle face 18, a pressure sensor 28, and a controller 30 with processor 32 and memory 34. The oral cleaning device 10 may also include a pressure indicator 46.

At optional step 520 of the method, a zero load calibration is performed while the device is charging within the charging station 410, as shown in FIG. 4A, or while the device is otherwise substantially vertical, such as when the device is in the hand of a user with no force applied. For example, when the toothbrush is placed on the charging base it can be assumed that there is zero load on the brush head and the corresponding sensor output can be obtained and analyzed. Once data corresponding to the known force value has been obtained, it can optionally be used to correct the output of the pressure sensor, including variations in both the offset and the gain of the sensor. According to an embodiment, data from a number of measurements acquired over a prolonged period of time such as days or weeks may be analyzed in order to eliminate or adjust sensor data which may be in error. The oral cleaning device 10 can be calibrated with the zero load pressure sensor data using any of a wide variety of different calibration methods.

Figure 4B:
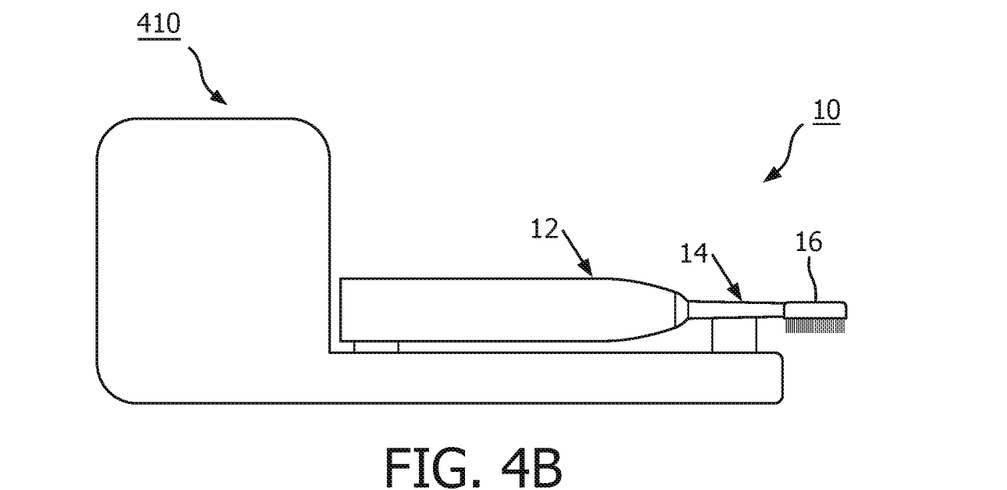
FIG. 4B is a schematic representation of an oral cleaning device system in accordance with an embodiment.
Figure 4C:
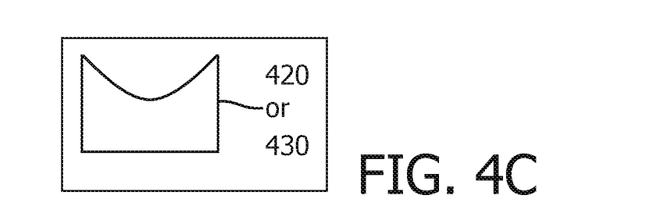
FIG. 4C is a schematic representation of an oral cleaning device support member in accordance with an embodiment.

At step 530 of the method, a non-zero load calibration is performed while the device is positioned horizontally within the charging station 410, as shown in FIG. 4B. In this position, a portion of the mass of the oral cleaning device 10 causes a known amount of pressure to be applied to the brush head member 14 and/or brush head 16. Once data corresponding to this known force value has been obtained, it can be used to correct the output of the pressure sensor, including variations in both the offset and the gain of the sensor. The oral cleaning device 10 can be calibrated with the non-zero load pressure sensor data using any of a wide variety of different calibration methods. According to one embodiment, the oral cleaning device 10 can be calibrated with both the zero load pressure sensor data and the non-zero load pressure sensor data.

Figure 6:
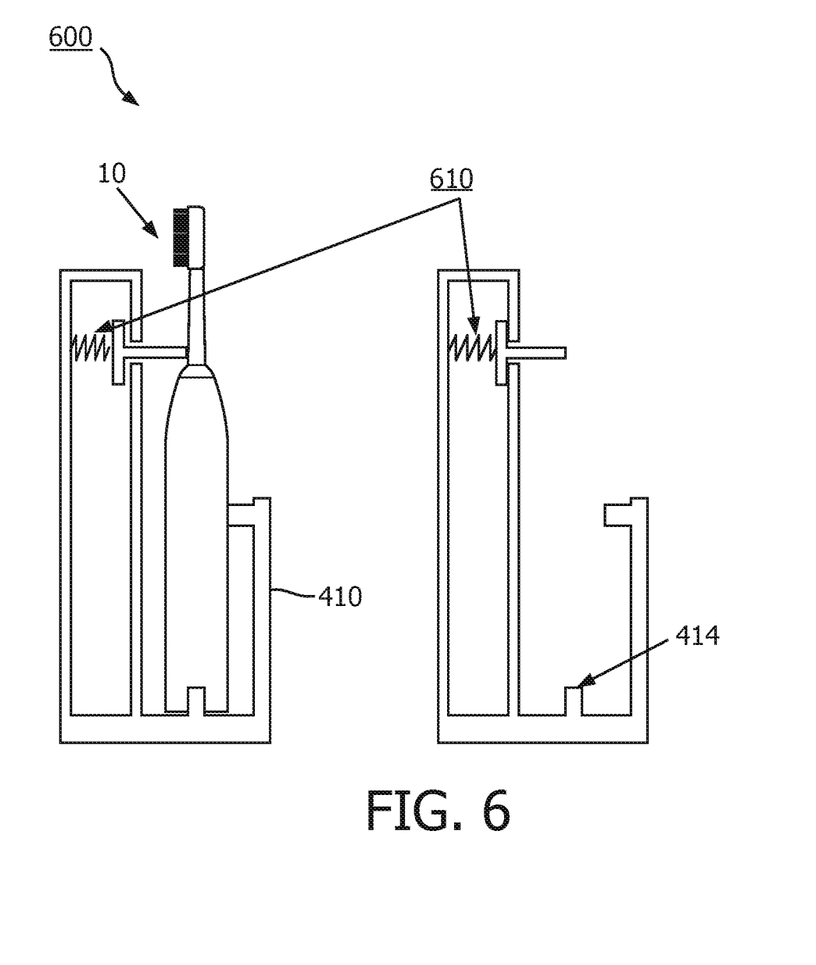
FIG. 6 is a schematic representation of an oral cleaning device system in accordance with an embodiment.

Referring to FIG. 6 is an embodiment of an oral cleaning system 600. According to an embodiment, oral cleaning system 600 includes an oral cleaning device 10 and a device 410 which is separate from the oral cleaning device. The oral cleaning device 10 can be any of the oral cleaning device embodiments disclosed or otherwise envisioned herein. According to an embodiment, oral cleaning device 10 includes one or more pressure sensors 28, and a controller 30 comprising a processor 32. According to an embodiment, device 410 is a charging or docking station 410 for the oral cleaning device 10. Charging station 410 can include a mechanism 414 for charging the handheld oral cleaning device when it is connected into the docking station. For example, the charging mechanism 414 can include one or more charging contacts corresponding to one or more charging contacts on the handheld device. The charging mechanism 414 can alternatively charge the device via contactless inductive coupling between the charging station 410 and the handheld oral cleaning device 10.

According to an embodiment, device 410 applies an external non-zero load to brush head member 14 and/or brush head 16 for calibration when the oral cleaning device is positioned within the device. In this embodiment, device 410 comprises a resistive force which applies an external non-zero load to brush head member 14 and/or brush head 16. The resistive force can be applied by a clip, spring 610, or other of a variety of force-applying mechanisms known in the art. For example, when the oral cleaning device is positioned within the device, the spring 610 is compressed and exerts a known force on the brush head member 14 and/or brush head 16 for calibration. Once data corresponding to this known force value has been obtained, it can be used to correct the output of the pressure sensor, including variations in both the offset and the gain of the sensor. The oral cleaning device 10 can be calibrated with the non-zero load pressure sensor data using any of a wide variety of different calibration methods. According to another embodiment, device 410 applies a variable resistive force to the oral cleaning device. For example, the device can apply a multi-level resistive force, starting with a low-level force (such as zero) then proceeding to a higher-level force. The variable force can be applied in steps or as a steady or periodic increase or decrease. Alternatively, the device can generate and apply a pulse or resistive force step from high to low or low to high when, for example, the device is placed on the charger. Many other embodiments are possible.

At step 540 of the method, the obtained calibration information or parameters are stored in memory 34 of oral cleaning device 10. The stored calibration information can be retrieved or otherwise utilized only at certain time periods such as periodic calibration time periods, or can be utilized whenever pressure sensor data is obtained. For example, obtained pressure sensor data can be adjusted utilizing the stored calibration information before it is compared to a pressure threshold or otherwise utilized.

Figure 8:
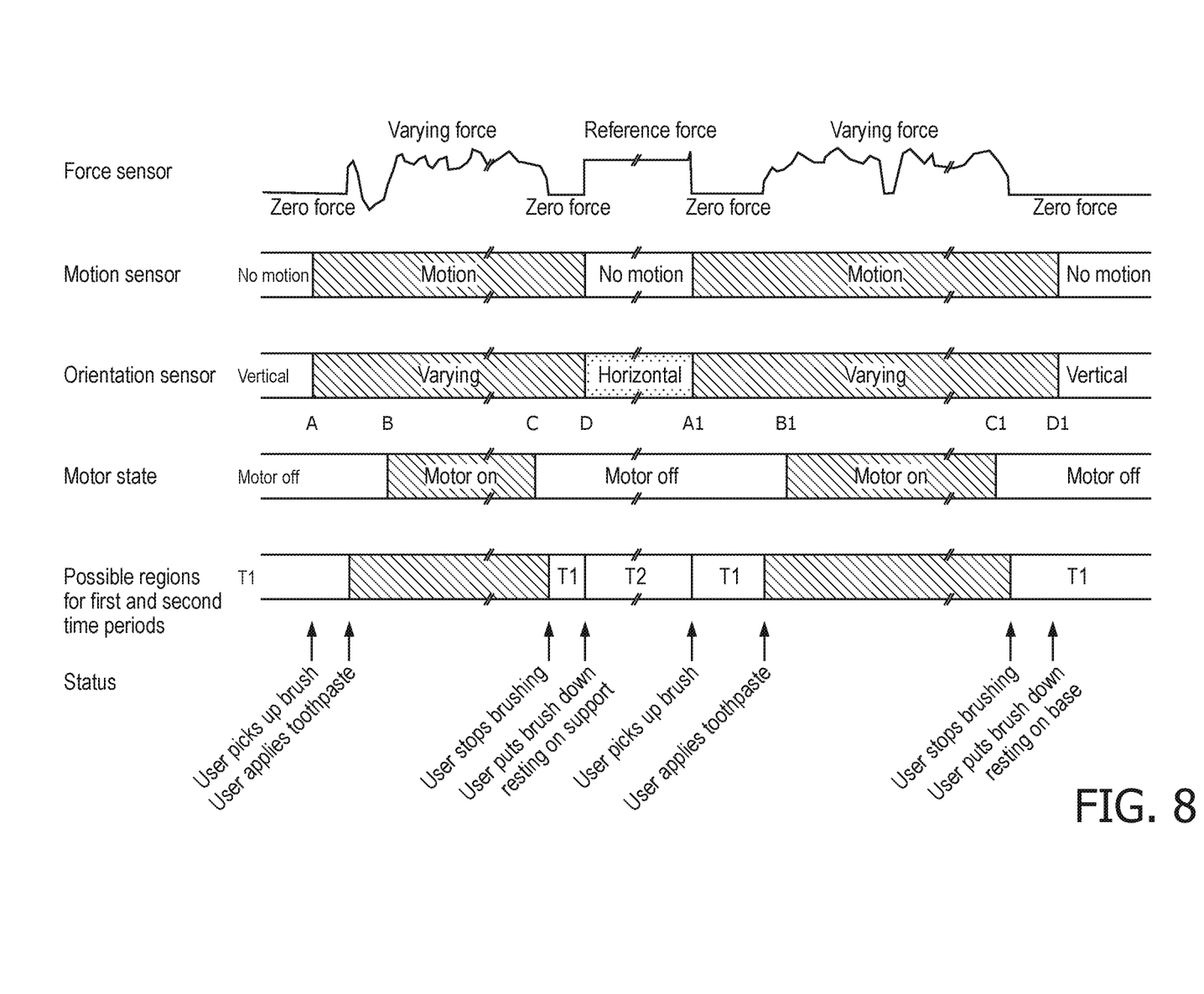
FIG. 8 is a graph of sensor data, brushing status, and potential calibration time periods, in accordance with an embodiment.

Referring to FIG. 8, in one embodiment, is a graph of approximately two brushing sessions using the oral cleaning device 10. According to an embodiment, the oral cleaning device is calibrated using a zero load during a time period labeled "T1," and is calibrated using a non-zero load during a time period labeled as "T2" in this figure. At the start of this graph, the oral cleaning device is positioned in a charging station, and is substantially vertical. The motor is off, and the orientation sensor, motion sensor, and force sensor are reading substantially zero. This is a possible time for a T1 calibration. For example, this zero load T1 calibration could be performed after the oral cleaning device is picked up by the user but before toothpaste is applied to the brush head. Accordingly, the zero load calibration can be performed at any point during the T1 time period, for example.

According to an embodiment, the amount of time required for a calibration—either zero load or non-zero load—maybe very short, for example representing an instant in time when a sample of the force sensor output is acquired, or may be longer, for example a number of seconds over which a number of samples of the force sensor output are taken and then processed to produce a representative output such as an average value.

The user then removes the oral cleaning device from the charging station at time "A" in FIG. 8, applies toothpaste, and engages drivetrain 22 at time "B" to generate and transmit movements to brush head member 14. When the user removes the oral cleaning device from the charging station, the pressure sensor, motion sensor, and orientation sensor obtain sensor readings indicative of pressure, motion, and orientation, respectively. The user then utilizes the oral cleaning device during the brushing session, during which time the pressure sensor, motion sensor, and orientation sensor continue to obtain sensor readings. According to an embodiment, during this time period, which can be indicated by, for example, variable pressure readings or motion sensor readings, the oral cleaning device may not undergo calibration. Instead, the oral cleaning device may use calibration data to adjust or normalize obtained pressure sensor readings.

At time "C," at the conclusion of a brushing session, the user turns off the motor. During this time no force is applied and the device enters another T1 during which zero load calibration may be performed. For example, this zero load T1 calibration could be performed after the user has finished using and cleaning or rinsing the oral cleaning device but before it is put down on the charging station.

At time "D" in FIG. 8, the user places the oral cleaning device substantially horizontally on the charging station or other receiving device 410, as shown in FIG. 4B. In this configuration, the oral cleaning device enters time "T2" during which non-zero load calibration may be performed. A portion of the mass of the oral cleaning device itself acts as the load to apply pressure to brush head member 14 and/or brush head 16. Alternatively, as shown in FIG. 6, the user places the oral cleaning device substantially vertical in the embodiment of charging station 410 with a compressed spring 610, and a non-zero load is applied to brush head member 14 and/or brush head 16. The oral cleaning device can stay in this position, for example, until the next brushing session.

According to an embodiment, the oral cleaning device can recognize that it has entered a T2 time period for a non-zero load calibration through a variety of mechanisms. As an example, the orientation sensor may detect that the device is substantially vertical and will assume that the device is positioned in the charging station for non-zero load calibration. Alternatively, first support 420 and/or second support 430 can comprise a magnetic or other proximity mechanism to indicate that the oral cleaning device is cradled or positioned within the supports. Alternatively, in an embodiment comprising a spring 610 to apply a non-zero load, compression of the spring can indicate to the system that the oral cleaning device has been placed into the charging station and is ready for a T2 time period for a non-zero load calibration. Many other mechanisms are also possible.

At time "A1" through "D1" in FIG. 8, the process is repeated. The length of any time period shown in FIG. 8 can be variable. Notably, the user can alternate between horizontal and vertical positions within the charging stand between each brushing session, but can select either only periodically. According to one embodiment, the oral cleaning device provides a notification to the user when a non-zero load calibration is required. The user can be informed to do a calibration by the brush itself or via a connected device. This can be determined by the system either with a timer or time-based mechanism, or can be determined by a detected need for a non-zero load calibration such as sporadic or highly variable pressure sensor readings. For example, the determination that a calibration is needed could be based on sensor readings which are significantly different from those expected from previous use. According to an embodiment, the timing of the T1 and T2 calibration periods can be determined by an algorithm which takes as input one or more of the following: one or more of the sensor outputs, the state of the oral care device, and time.

Although the examples show constant zero and non-zero loads, this could also be using an alternating input with a certain amplitude. According to an embodiment, it may also be desirable to put the motor into a special state during a force measurement, such as a low-amplitude motion in order to achieve a more accurate measurement of force.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An oral cleaning device, the oral cleaning device comprising:
    a body portion;
    an elongated member extending from the body portion and comprising a head;
    a pressure sensor configured to obtain a measurement of a force applied to the head by a user during a cleaning session; and
    a processor configured to receive, from the pressure sensor, the measurement of force applied to the head, and further configured to: (i) obtain a non-zero load calibration parameter from a non-zero load applied to the elongated member, wherein the mass of at least a portion of the oral cleaning device is the non-zero load; and (ii) calibrate, using the obtained non-zero load calibration parameter, the measurement of force received from the pressure sensor.

2. The oral cleaning device of claim 1, wherein the processor is further configured to obtain a zero load calibration parameter, and wherein the calibration is performed using both the obtained non-zero load calibration parameter and the obtained zero load calibration parameter.

3. The oral cleaning device of claim 1, wherein the processor is configured to obtain the non-zero load calibration parameter at a time other than during the cleaning session.

4. The oral cleaning device of claim 1, wherein the oral cleaning device is oriented substantially horizontally to obtain the non-zero load calibration parameter.

5. An oral cleaning device, the oral cleaning device comprising:
   a body portion;
   an elongated member extending from the body portion and comprising a head;
   a pressure sensor configured to obtain a measurement of a force applied to the head by a user during a cleaning session; and
   a processor configured to receive, from the pressure sensor, the measurement of force applied to the head, and further configured to: (i) obtain a non-zero load calibration parameter from a non-zero load applied to the elongated member while the oral cleaning device is compressing a resistive force applied to the elongated member; and (ii) calibrate, using the obtained non-zero load calibration parameter, the measurement of force received from the pressure sensor.

6. The oral cleaning device of claim 5, wherein the resistive force is applied by a spring.

7. An oral cleaning system, the oral cleaning system comprising:
   an oral cleaning device comprising: a body portion; an elongated member extending from the body portion and comprising a head; a pressure sensor configured to obtain a measurement of a force applied to the head by a user during a cleaning session; and a processor configured to receive, from the pressure sensor, the measurement of force applied to the head, and further configured to: (i) obtain a non-zero load calibration parameter from a non-zero load applied to the elongated member; and (ii) calibrate, using the obtained non-zero load calibration parameter, the measurement of force received from the pressure sensor; and
   a charging station configured to receive and connect to the oral cleaning device;
   wherein the processor is configured to obtain the non-zero load calibration parameter while the oral cleaning device is connected to the charging station; and
   wherein the charging station comprises a support configured to receive at least a portion of the oral cleaning device such that a non-zero load is applied to the oral cleaning device and is detected by the pressure sensor.

8. The oral cleaning system of claim 7, wherein the support is configured such that the mass of at least a portion of the oral cleaning device is the non-zero load.

9. An oral cleaning system, the oral cleaning system comprising:
   an oral cleaning device comprising: a body portion; an elongated member extending from the body portion and comprising a head; a pressure sensor configured to obtain a measurement of a force applied to the head by a user during a cleaning session; and a processor configured to receive, from the pressure sensor, the measurement of force applied to the head, and further configured to: (i) obtain a non-zero load calibration parameter from a non-zero load applied to the elongated member; and (ii) calibrate, using the obtained non-zero load calibration parameter, the measurement of force received from the pressure sensor; and
   a charging station configured to receive and connect to the oral cleaning device;
   wherein the processor is configured to obtain the non-zero load calibration parameter while the oral cleaning device is connected to the charging station; and
   wherein the charging station comprises a resistive force mechanism configured to apply a resistive force to at least a portion of the oral cleaning device such that a non-zero load is applied to the oral cleaning device and is detected by the pressure sensor.

10. A method for calibrating a pressure sensor of an oral cleaning device, the method comprising the steps of:
    providing an oral cleaning device, the oral cleaning device comprising a body portion; an elongated member, extending from the body portion and comprising a head; a pressure sensor configured to obtain a measurement of a force applied to the head by a user during a cleaning session; and a processor configured to receive, from the pressure sensor, the measurement of force applied to the head;
    obtaining a non-zero load calibration parameter from a non-zero load applied to the elongated member;
    calibrating, by the processor using the non-zero load calibration parameter, the measurement of force received from the pressure sensor; and
    positioning the oral cleaning device such that the mass of at least a portion of the oral cleaning device comprises the non-zero load.

11. The method of claim 10, further comprising the step of obtaining a zero load calibration parameter, and wherein said calibrating step comprises calibrating, by the processor using both the non-zero load calibration parameter and the zero load calibration parameter, the measurement of force received from the pressure sensor.

12. A method for calibrating a pressure sensor of an oral cleaning device, the method comprising the steps of:
    providing an oral cleaning device, the oral cleaning device comprising a body portion; an elongated member, extending from the body portion and comprising a head; a pressure sensor configured to obtain a measurement of a force applied to the head by a user during a cleaning session; and a processor configured to receive, from the pressure sensor, the measurement of force applied to the head;
    obtaining a non-zero load calibration parameter from a non-zero load applied to the elongated member;
    calibrating, by the processor using the non-zero load calibration parameter, the measurement of force received from the pressure sensor; and
    applying a resistive force to the oral cleaning device such that the resistive force comprises the non-zero load.

* * * * *